June 20, 1961 J. F. HELY 2,988,774
METHOD AND APPARATUS FOR THE PRODUCTION OF SOAP TABLETS
Filed Aug. 6, 1958
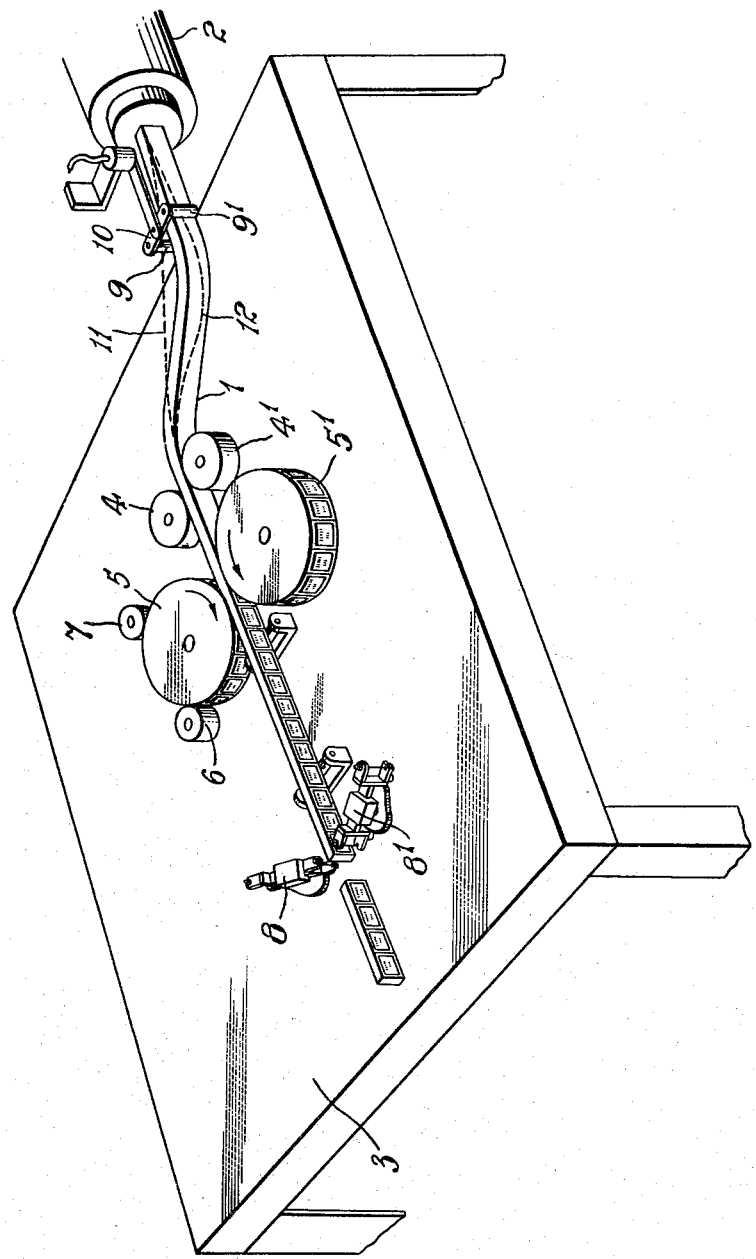
J. F. Hely INVENTOR
by
Brumbaugh, Free, Graves & Donohue
His Attorneys

United States Patent Office 2,988,774
Patented June 20, 1961

2,988,774
METHOD AND APPARATUS FOR THE PRODUCTION OF SOAP TABLETS
John Frederick Hely, Blakehurst, Sydney, Australia, assignor to Lever Brothers Company, New York, N.Y., a corporation of Maine
Filed Aug. 6, 1958, Ser. No. 753,532
10 Claims. (Cl. 18—2)

This invention relates to the production of soap tablets bearing an impressed design, and to a method and apparatus for impressing a design on a bar of soap or other material that is being fed forward in a plastic condition.

In the manufacture of soap tablets, the molten 63% soap is solidified and reduced to chips or ribbons, which are, if it is desired to produce toilet soap, dried to a fatty matter content of 75 to 82%. The chips or ribbons are then milled, thereafter plodded, i.e. compressed into a compact homogeneous mass which is extruded as a bar from a die plate, cut into billets and then stamped.

The present invention provides a method and apparatus whereby the design which is to appear on the tablets is impressed on the bar by feeding the bar continuously to the nip (preferably directly from the extruder by which it is formed) between two rotatable rollers, the cylindrical surfaces of which bear a plurality of equispaced designs which are the inverse relief of the design to be impressed on the tablet. The method and apparatus of the invention are also applicable to the impressing of bars of other material of similar physical properties while such bars are being fed forward.

In operating a method of impressing such as that referred to above it is necessary to ensure that the roller speed (i.e. the linear speed of the cylindrical surfaces of the rollers) remains substantially constant in relation to the speed at which the bar of soap or other material is fed towards the impressing rollers. When the feeding is done by extruding the bar, variations in the rate of feed commonly arise owing, for instance, to variations in the viscosity of the material. It is therefore necessary so to control the roller speed that any variation in speed of feed is closely followed by a corresponding variation in roller speed. In the method of the invention this is done by feeding the bar to the rollers along a path which is not straight, so that any alteration in the roller speed relative to the speed of feed will cause a displacement of the actual path from a predetermined path (the actual path becoming longer or shorter accordingly as the feed speed becomes greater or less than the roller speed) detecting any such displacement and in accordance therewith altering the roller speed to eliminate the displacement.

The present invention therefore comprises a method of impressing the surface of a bar of material that is being fed in plastic condition from a feed point to the nip of a driven pair of impressing rollers, wherein the path of the bar from the feed point to the nip is not straight and the roller speed is controlled in relation to the speed at the feed point according to said path so that a displacement of said path from a predetermined path causes a variation in the roller speed that eliminates the displacement.

The feed means may with advantage comprise a screw extruder which continuously forms the bar and feeds it forward towards the impressing rollers. Preferably the bar is fed from the feed point to a guide point immediately behind (i.e. on the feed-point side of) the nip of the impressing rollers and is from that point guided into said nip (for instance, by means of a pair of guide rollers) along a path tangential to the impressing rollers at the nip, the direction of extrusion being parallel to, but offset from, said path.

Beyond the impressing rollers the bar may be cut into tablets. In so doing it is of course necessary that the cutters employed should be synchronized with the speed of the bar of material past them, i.e. with the speed of the impressing rollers, so that the cuts are made between successive impressed areas of the bar. The drive for the cutters is therefore, preferably coupled directly to the drive for the impressing rollers.

Apparatus according to the invention comprises: a pair of impressing rollers mounted on vertical axes, variable speed means for driving said rollers, means for feeding said bar to the nip of the rollers along a variable, substantially horizontal, path that is not straight, means for detecting displacements in said path due to variation in the rate of feed relative to the roller speed, and means operated by the displacement-detecting means for so controlling the roller speed that any such displacement causes a variation in said roller speed that eliminates the displacement.

Preferably the feeding means comprises a screw-extruder for continuously forming the bar and feeding it along said path. As indicated above, a pair of guide rollers is preferably provided for guiding the bar to the nip of the impressing rollers along a path tangential to the impressing rollers at the nip and the extruder is offset from said path and arranged to extrude the bar in a direction parallel thereto.

In the preferred form of apparatus the means for detecting displacement in the path of the bar comprises a lever pivotally mounted to swing in a horizontal plane above the path of the bar, said lever carrying two fingers downwardly depending, one on each side of said path, so that displacement of the bar to either side of a predetermined path causes the lever to swing to that side, and the said lever is coupled to means for controlling the speed of the impressing rollers so that movement of the lever caused by a displacement of the bar which increases the length, its path increases said speed and vice versa.

For cutting the impressed bar into tablets the apparatus may with advantage include a pair of reciprocating cutters, one on each side of the path of the bar beyond the impressing rolls, said cutters being arranged to co-operate in cutting the bar into tablets between successive impressed areas, the drive for said cutters being directly coupled to the drive for the impressing rollers.

The invention will now be described in greater detail with reference to the accompanying drawing which shows diagrammatically an isometric view of the apparatus.

The soap bar 1 is extruded through the orifice plate of a "plodder" 2 (i.e. a screw-extruder) on to a table 3. The bar passes between a set of guide rollers 4, 4' and then through the nip of a pair of impressing rollers 5, 5'. The cylindrical surfaces of the impressing rollers bear a plurality of equispaced designs which are the inverse relief of the design to be impressed on the tablets. The surfaces of the impressing rollers are cleaned by rotary cleaning mops 6, only one of which is shown. If desired, ink may be applied to the impressing rollers by means of a rotary inking roller 7. This enables a coloured design to be impressed on the bar. The impressed soap bar passes over two supporting idler rollers and then between a pair of cooperating cam operated wire cutters 8, 8', the operating cams of which are driven by positive gearing (not shown) from the drive for the impressing rollers. These cutters cut the bar into tablets between successive impressed areas. The impressing rollers 5, 5' are driven by a thyratron controlled variable speed D.C.-motor (not shown).

It will be noted that the centre line of the plodder 2 is offset relative to the line which passes through the guide rollers, impressing rollers and cutter units. As a result, the position which the bar will take up between the plodder and the guide roller depends on the speed of extrusion relative to the speed of rotation of the impressing rollers. The position of the bar is detected by passing the bar between two fingers 9, 9' mounted on a crossbar 10 carried on the end of a lever which can swivel about a vertical pivot which is not visible. The movement of the bar actuates transmitter-repeater means, specifically a Selsyn, shown diagrammatically, carried by a bracket which also carries the pivot for the lever. The transmitter-repeater means control the variable speed drive. The dotted line 11 shows the centre line of the bar when the peripheral speed of the impressing rollers is greater than the speed of extrusion; the dotted line 12 shows the centre line when the speed is less. Thus by correct adjustment, the speed of the impressing rollers is always kept in step with that of the extruded bar.

In the particular example, the diameter of the impressing rollers was approximately 16", there were 16 designs on each impressing roller, and the speed of the bar leaving the impressing rollers was 62 feet per minute.

I claim:

1. A method of impressing the surface of a bar of material in a plastic condition, comprising: feeding said bar in a substantially horizontal plane from a feed point to the nip of a driven pair of cylindrical impressing surfaces rotating about vertical axis, said nip being offset from the direction of feed at the feed point and the bar following a path which is not straight between the feed point and said nip; and causing, on the occurrence of any variation in the rate of feed, the consequent lateral displacement of said bar from said path to produce a signal operating to vary the speed of said surfaces so as to eliminate the said lateral displacement.

2. A method according to claim 1 wherein said material is soap.

3. A method of impressing opposed surfaces of a bar of material in a plastic condition, comprising: feeding said bar in a substantially horizontal plane from a feed point to the nip of a driven pair of cylindrical impressing surfaces rotating about vertical axes, said nip being offset from the direction of feed at the feed point; causing said bar to adopt a generally curved path in the area between said feed point and said nip but a straight path along a line tangential to the surfaces at the nip in the area immediately in advance of said nip; and causing any lateral displacement of said bar from said curved path to produce a signal operating to vary the speed of said surfaces so as to eliminate said lateral displacement.

4. A method of impressing the surface of a bar of material in a plastic condition, comprising: continuously forming said bar by extrusion of the material at a feed point; feeding said bar in a substantially horizontal plane from the feed point to the nip of a driven pair of cylindrical impressing surfaces rotating about vertical axes, said nip being offset from the direction of extrusion at the feed point and the bar following a curved path between the feed point and a point adjacent but behind said nip; guiding the bar to the nip from said point so that the portion of said path between said point and said nip is tangential to the cylindrical surfaces at said nip and parallel to, but offset from, the direction of extrusion at the feed point; and causing, on the occurrence of any variation in the rate of feed, the consequent lateral displacement of said bar from said path to produce a signal operating to vary the speed of said surfaces so as to eliminate the said lateral displacement.

5. A method according to claim 4 further comprising the step of continuously cutting the bar of material into lengths between successive impressed areas on emerging from the nip of the impressing surfaces.

6. Apparatus suitable for impressing material travelling in a plastic condition in the form of a bar, which comprises: a pair of impressing rollers having cylindrical impressing surfaces, said rollers being mounted on vertical axes; variable speed means for driving said rollers; means for feeding said bar to the nip of the rollers in a substantially horizontal plane along a path which is not straight; means for detecting on the occurrence of any variation in the rate of feed, lateral displacement of said bar from said path; and means operated by the displacement-detecting means for so controlling the roller speed that any such displacement causes a variation in said roller speed that eliminates the displacement.

7. Apparatus suitable for impressing material travelling in a plastic condition in the form of a bar, which comprises: a pair of impressing rollers having cylindrical impressing surfaces, said rollers being mounted on vertical axes; variable speed means for driving said rollers; an extruder for forming said bar and feeding it to the nip of said rollers in a substantially horizontal plane along a path which is not straight, the extruder being positioned so that the direction of extrusion at the extruder is offset from said nip; a pair of guide rollers for guiding the bar to said nip from a point behind said nip in such manner that the portion of said path between said point and said nip is tangential to the cylindrical surfaces at said nip and said portion is parallel to, but offset from, the direction of extrusion at the extruder; means for detecting, on the occurrence of any variation in the rate of feed, lateral displacement of said bar from said path; and means operated by the displacement-detecting means for so controlling the roller speed that any such displacement causes a variation in said roller speed that eliminates the displacement.

8. Apparatus suitable for impressing material travelling in a plastic condition in the form of a bar, which comprises: a pair of impressing rollers having cylindrical impressing surfaces, said rollers being mounted on vertical axes; variable speed means for driving said rollers; a screw extruder for forming said bar and feeding it to the nip of said rollers in a substantially horizontal plane along a path which is not straight, the extruder being positioned so that the direction of extrusion at the extruder is offset from said nip; a pair of guide rollers for guiding the bar to said nip from a point behind said nip in such manner that the portion of said path between said point and said nip is tangential to the cylindrical surfaces at said nip and said portion is parallel to, but offset from, the direction of extrusion at the extruder; a lever pivotally mounted to swing in a horizontal plane above said path, said lever carrying two fingers downwardly depending, one on each side of said path, said lever coupled to means for controlling the speed of said impressing rollers in such manner that a movement of the lever caused by displacement of the bar from said path occasioned by variation in rate of feed which increases the length of said path increases the speed of said impressing rollers and vice versa.

9. Apparatus according to claim 6, wherein the feeding means comprise a screw-extruder for continuously forming the bar and feeding it along the said path.

10. Apparatus according to claim 6, including a pair of reciprocating cutters, one on each side of the path of the bar beyond the impressing rollers, said cutters being arranged to co-operate in cutting the bar into a number of substantially identical tablets between successive impressed areas, the drive for said cutters being directly coupled to the drive for the impressing rollers.

References Cited in the file of this patent

UNITED STATES PATENTS

| | | |
|---|---|---|
| 1,850,856 | Weindel | Mar. 22, 1932 |
| 2,449,139 | Poster | Sept. 14, 1948 |
| 2,534,291 | Moss | Dec. 19, 1950 |
| 2,726,922 | Merrill et al. | Dec. 13, 1955 |
| 2,895,170 | Carlile | July 21, 1959 |